June 27, 1967
A. HOROWITZ
3,328,099
AXIAL ROLLER BEARING AND ROLLER CAGE
Filed Aug. 10, 1964
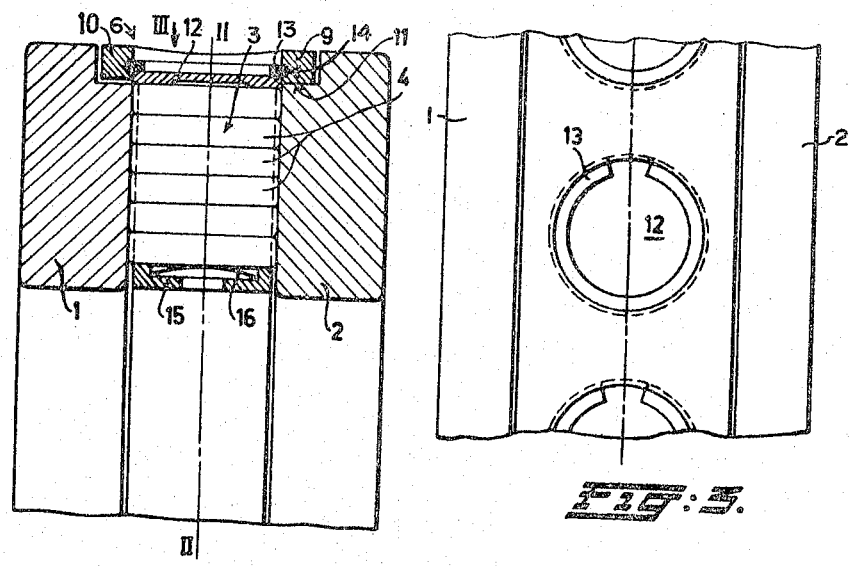
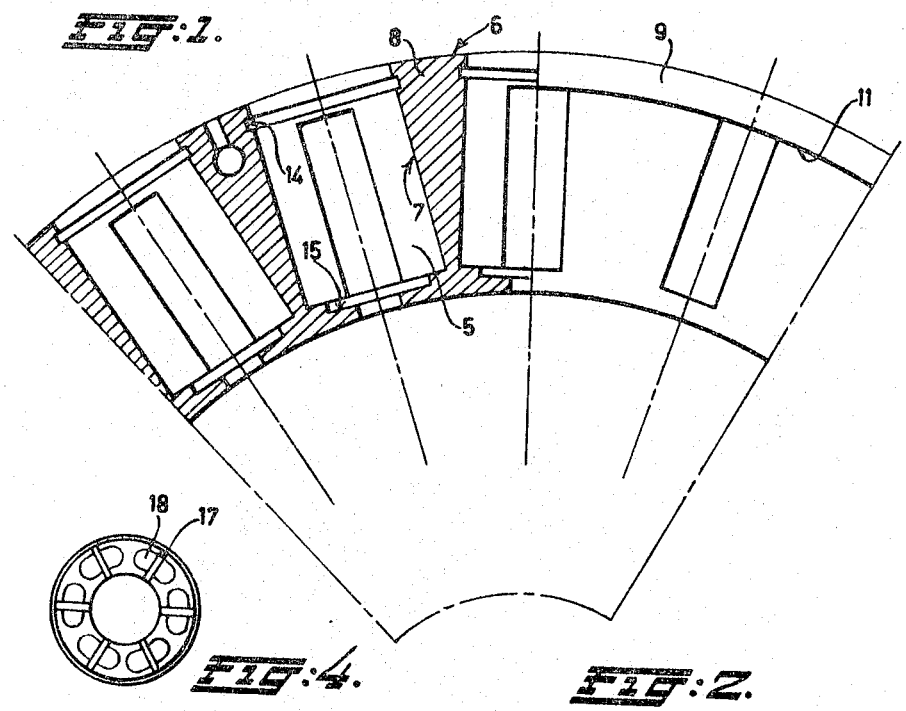
INVENTOR.
ALEXANDRE HOROWITZ
BY
Semmes & Semmes
ATTORNEYS

United States Patent Office 3,328,099
Patented June 27, 1967

3,328,099
AXIAL ROLLER BEARING AND ROLLER CAGE
Alexandre Horowitz, Pelikaanlaan 10,
Eindhoven, Netherlands
Filed Aug. 10, 1964, Ser. No. 388,649
Claims priority, application Netherlands, Aug. 26, 1963,
297,140
5 Claims. (Cl. 308—235)

The invention relates to axial roller bearings comprising two ring races, and lying there between a number of mainly cylindrical rollers positioned in holes of a solid annular cage. In such roller bearings, which are known in different variants, there is always the customary relation between portative capacity and life while the number of revolutions is upwardly limited by two factors, namely generated heat and wear due to friction.

The losses due to friction cohere directly with the compressive force transmitted by the bearing and the relative sliding between the rollers, the races and the cage, and limit the number of revolutions by their heat generation.

This is also limited by the centrifugal force related to it, which presses the rollers against the cage and in that way add to the arising of losses due to friction, heat generation and wear.

The invention aims in the first place at providing roller bearings with greater portative capacity than the roller bearings known up to now. A further object of the invention is to render it possible to place more rollers in the cage by the same diameter of the bearing, so as to create a larger active contact surface and consequently a greater portative capacity.

It is another object of the invention to replace the line contact between the periphery of the rollers and the cage by a curved contact surface, which is favourable with regard to the guiding of the rollers and to the loss of lubricant when excessively lubricated.

The invention also aims at absorbing the radial pressure, resulting from the centrifugal force, exerted by the rollers, with the least possible friction losses.

When in operation the rollers are subject to the influence of additional couples with a tangentially directed axis, mainly such as the coriolis couple. Therefore the invention aims at providing the rollers with guiding means. In the roller bearings known thus far, solely by the contact surfaces between the rollers and the running races provide the required guiding.

The additional forces between the rollers and the running races as a result hereof, have been reduced by making the length of the roller sufficiently large with respect to its diameter, namely as a rule at least equal its diameter. A further object of the invention consists in making it possible to drop the requirement regarding sufficient length for the rollers.

The invention will be more clearly explained with reference to the drawing in which an embodiment of the roller bearing is shown in accordance with the invention.

FIG. 1 is a radial section of this embodiment.

FIG. 2 is a side view and partly a section through the line II—II in FIG. 1 of the roller cage belonging to this embodiment.

FIG. 3 is a top view according to arrow III of the roller bearing of FIG. 1.

FIG. 4 is a front view of the side of a closing disc of the roller bearing of FIG. 1, constructed as a step bearing.

As one can see in FIG. 1 the roller bearing comprises two ring races 1 and 2 with a number of rollers 3 in between, each built up out of a number of discs 4 lying on top of each other. These rollers 3 are set in holes 5 of a roller cage 6 (see FIG. 2), which holes are carried out as radial bores 7. The cage 6 is made of a solid ring 8 with two axially directed thickenings 9 and 10 at the outer periphery. The thickening 9 is bearing by 11 upon the adjacent ring race 2 and therefore serves for guiding the cage 6. Besides its guiding function, the thickening 9 as well as the thickening 10 render the cage 6 stronger, which makes it possible to drill the bores 7 very close to each other. This last mentioned fact entails that while the diameter of the cage remains the same, more rollers can be placed in the cage according to the invention, which gives an increase in the portative capacity or life of the roller bearing.

Each roller 3 is locked in its hole 5 by means of a closing disc 12 which is positioned and directed by means of a spring ring 13 in a groove 14. On the bottom of the hole 5 that is drilled to a blind bore 7 there is a deepening 15 in the material of the cage 6 in which a spring element 16 is mounted. This element presses the roller 3 or the disc 4 against the closing disc 12.

The side of the closing disc 12 that is turned towards the concerning roller 3 or to the top disc 4 is constructed as a so called step bearing, as is to be seen in FIG. 4. This step bearing comprises a number of grooves 17 in which very shallow excavations debouch. By means of this step bearing a hydrodynamic lubrication is obtained between the most outward front face of the rollers 3 and the closing discs 12 concerned.

The embodiment described here has the advantage that, with regard to the conventional axial roller bearings, there is a considerable decrease in losses due to friction.

Every disc 4 can adjust itself to the average velocity of the contact path of the ring races with which it is in contact. The losses due to friction between the rollers 3 on the one hand and the ring races 1 and 2 on the other hand are hereby considerably reduced, so that the number of revolutions can be noticeably increased. On the other hand, however, some slight friction will appear between the discs 4 of each roller 3, that are lying on top of each other.

These last mentioned frictional losses, however, are— also as a result of the slight difference in rotary velocity— quite small.

The generated heat can consequently be removed easily.

The closing disc 12 and the spring element 16 keep the roller discs 4 aligned, even immediately at the start of the rotation of the roller bearings, that means at the moment when the centrifugal force is not yet active.

In this way the rollers or the roller discs are always in running position and need not be "run in" first, when starting the roller bearing.

Through the closing discs 12 with their guiding or directing function it is now possible to give to the outer periphery of each disc 4 a convex shape. Thus not only in the contact surface of every disc will there be a better stress distribution, but there will also be a further decrease in friction between the discs and the ring races.

On the other hand the occurring centrifugal forces and other disturbing forces on the rollers can be easier absorbed and also cause less frictional loss. This means that the admissible number of revolutions is higher than was possible by bearings with the same exterior dimensions known thus far.

What I claim is:

1. An axial roller bearing, comprising two ring races, an annular one-piece solid cage lying between said races, said cage including a plurality of holes within which are located corresponding generally cylindrical rollers, said holes being formed as radial blind holes, means shutting off the bores at their outer peripheries to prevent outward movement of said rollers, said cage including radially directed prongs between said bores whereby a greater number of rollers may be accommodated into said bearing while confining said rollers axially in the annular cage and also including at the outer periphery thereof at least one axially directed thickening portion bearing against the race adjacent thereto, said thickening portion linking the outward extremities of said prongs.

2. An axial roller bearing, comprising two ring races, a number of mainly cylindrical rollers positioned in holes of a solid annular cage lying therebetween, said holes of said roller cage being bounded at their most outwardly lying front faces by a closing disc which are accurately directed perpendicular to the radial and which are grooved on the sides which are turned towards said roller to insure hydrodynamic lubrication.

3. A roller bearing as in claim 2, including a spring element located between the most central front face of said rollers and the bottom of the related bore in said roller cage, said spring element pressing the roller against said closing disc when not in operation.

4. A roller bearing as in claim 1, wherein said holes of said roller cage are bounded at their most outwardly lying front faces by a closing disc while said rollers are built up out of a number of discs lying on top of each other, the thickness of said discs being no greater than ½ the diameter of said closing disc, said discs having convex shaped outer peripheries.

5. A roller bearing as in claim 2, including a roller cage comprising a solid ring with holes, said ring having at least one axially directed thickening at its outer periphery, said holes of said solid ring being carried out as radial bores shut off at the outer periphery thereof by a closing disc mounted in said bores.

References Cited

UNITED STATES PATENTS

| 718,111 | 1/1903 | Eveland | 308—235 |
| 3,058,788 | 10/1962 | Kaplan | 308—187 |

FOREIGN PATENTS 146,061    7/1920    Great Britain.

MARTIN P. SCHWADRON, *Primary Examiner.*

FRANK SUSKO, *Examiner.*